United States Patent [19]

Maynus

[11] Patent Number: 5,010,529
[45] Date of Patent: Apr. 23, 1991

[54] UNDERWATER TRANSMITTER APPARATUS

[76] Inventor: Kenneth A. Maynus, 1920 E. Almeria, Phoenix, Ariz. 85006

[21] Appl. No.: 508,655

[22] Filed: Apr. 13, 1990

[51] Int. Cl.[5] .............................................. H04B 1/02
[52] U.S. Cl. .................................... 367/137; 367/131
[58] Field of Search ............... 367/131, 132, 133, 134, 367/137

[56] References Cited

U.S. PATENT DOCUMENTS

| | | | |
|---|---|---|---|
| 3,267,414 | 8/1966 | Kritz | 367/132 |
| 3,337,841 | 8/1967 | Wainwright et al. | 367/132 |
| 3,467,414 | 9/1969 | Downing | 29/508 |
| 3,469,231 | 9/1969 | Gaeiling et al. | 367/134 |
| 3,686,656 | 8/1972 | Richards | 367/134 |
| 3,986,161 | 10/1976 | Mackellar | 367/137 |
| 4,095,667 | 6/1978 | Mahig, et al. | 367/910 |
| 4,281,404 | 7/1981 | Morrow | 367/910 |
| 4,635,242 | 1/1987 | Hart | 367/134 |

Primary Examiner—Thomas H. Tarcza
Assistant Examiner—Daniel T. Pihulic
Attorney, Agent, or Firm—H. Gordon Shields

[57] ABSTRACT

Underwater signal apparatus includes a waterproof housing having two chambers, a sealed chamber in which is disposed a transducer and electrical circuitry associated with the transducer. In the second chamber is a battery for providing the necessary electrical power for the transducer and its circuitry. The battery compartment is accessible for changing the battery. The transducer comprises one wall of the sealed chamber and is thus in direct contact with the water. The transducer circuitry is activated by a magnet movable on the housing. Within the sealed chamber in the housing is a magnetic read switch which is closed by the proximity of the magnet movable on the exterior of the housing.

15 Claims, 1 Drawing Sheet

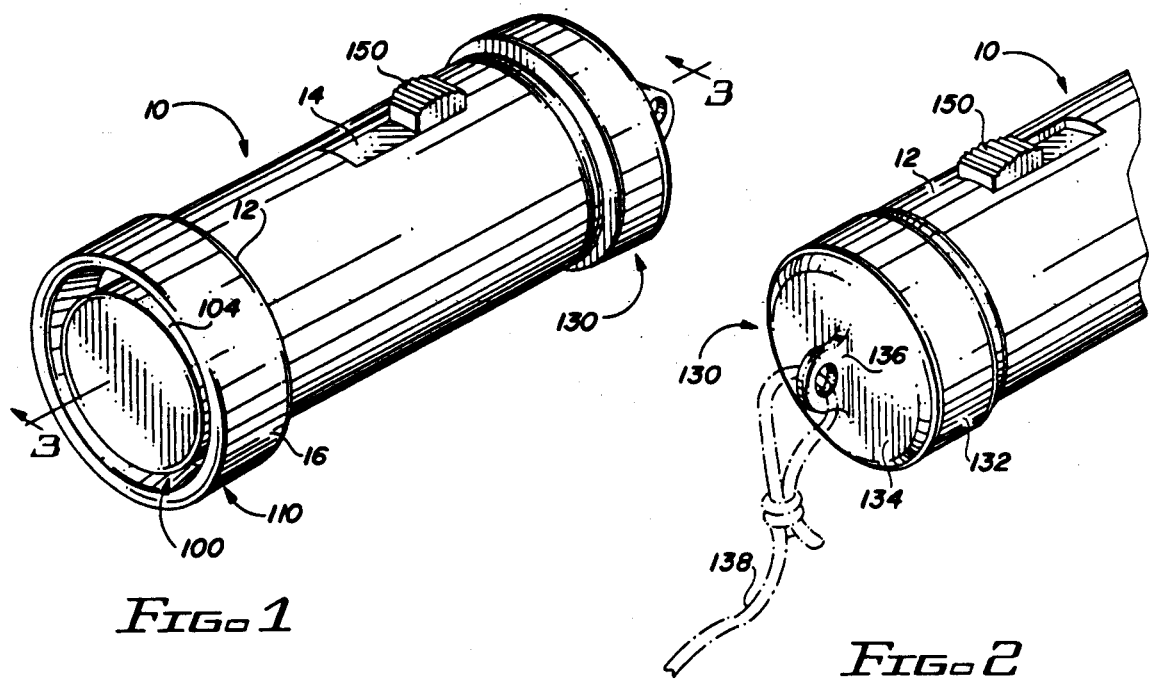
Fig. 1
Fig. 2
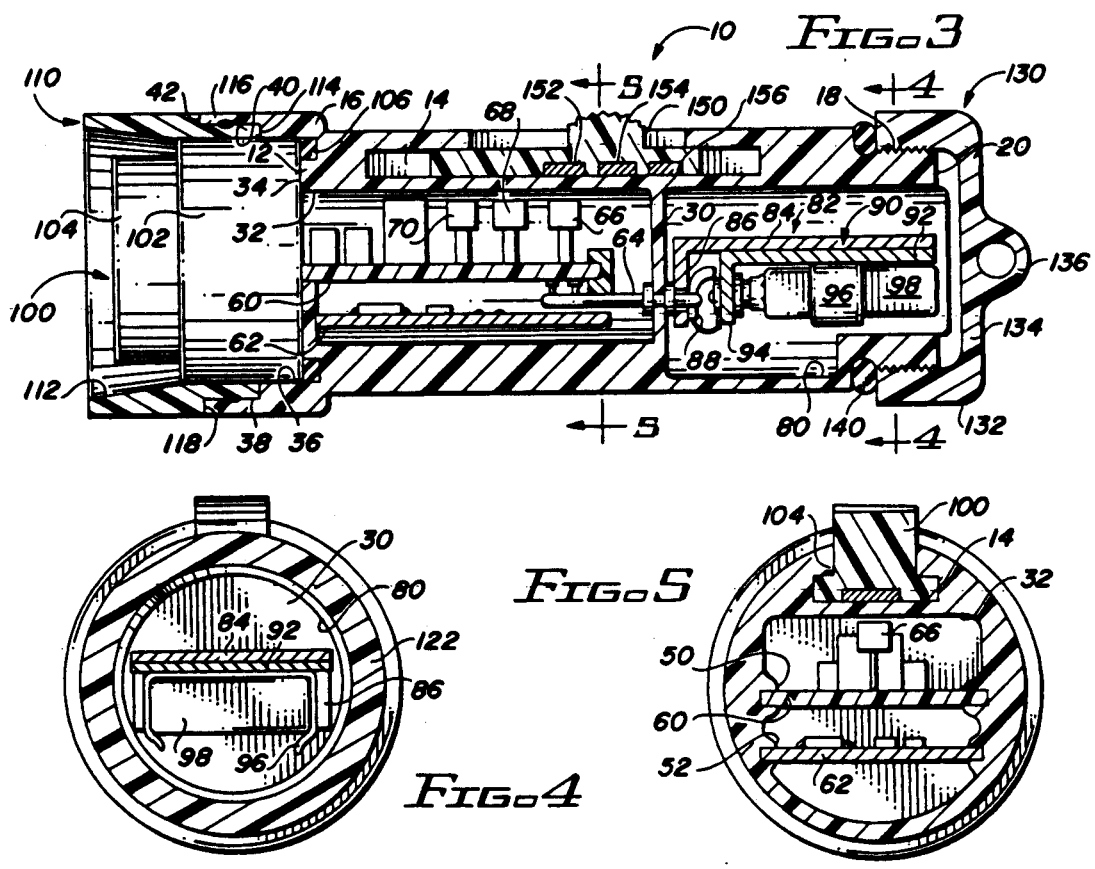
Fig. 3
Fig. 4
Fig. 5

UNDERWATER TRANSMITTER APPARATUS

BACKGROUND OF THE INVENTION

Field of the Invention

This invention relates to underwater transmitting apparatus and, more particularly, to a hand-held underwater apparatus for transmitting an audible alarm signal.

Description of the Prior Art

U.S. Pat. No. 3,267,414 (Kritz) discloses portable underwater communications unit capable of voice or code transmission between free divers or between a diver and a vessel. The apparatus utilizes both transmitting and receiving apparatus for voice modulated, ultrasonic acoustic signal and sonar apparatus for code signals.

U.S. Pat. No. 3,337,841 (Wainwright et al) discloses underwater communications apparatus for providing voice communication between underwater swimmers. The apparatus is, essentially, underwater telephone apparatus which includes both transmitting and receiving elements.

U.S. Pat. No. 3,469,231 (Geiling et al) discloses communicating apparatus for communications between free swimming divers. The apparatus includes transducers transmitting and receiving ultrasonic frequencies.

U.S. Pat. No. 3,686,656 (Richards) discloses an automatic sound generating apparatus which generates a sound under water when a pressure responsive switch is closed to connect sound generating apparatus to an electrical current source. The apparatus is self-contained, and it is designed to be placed in a vessel so that if the vessel sinks, the apparatus will automatically transmit sound to help in locating and recovering the vessel.

U.S. Pat. No. 3,986,161 (MacKellar) discloses underwater directional guidance apparatus which utilizes a transducer within a housing and the transducer is activated through switches which are magnetically activated. A ring or collar disposed about the circular housing in which the transducer and its electrical components, including a battery, are housed, is rotatable. A magnet secured to the collar actuates switch elements when the magnet is brought into proximity of the switch elements.

U.S. Pat. No. 4,095,667 (Mahig et al) discloses portable underwater signaling apparatus which utilizes compressed air to drive a hammer against a diaphragm to generate sound waves transmitted through the water.

U.S. Pat. No. 4,281,404 (Morrow, Jr. et al) discloses a hand-held, self-contained depth finding apparatus. The apparatus is in the general configura-tion of a pistol, with the "barrel" of the pistol providing directional control for both sending and receiving sonic pulses for determining the depth of water.

U.S. Pat. No. 4,635,242 (Hart) discloses portable self-contained underwater signaling device utilized by a diver to transmit different types of signals. A three position switch is used to control the output of the signal generator. The switch includes an off or open position, a momentary on position, and a full on position. The output from the apparatus is different in the various positions.

The apparatus of the present invention differs from the above disclosed patents in several regards. For one thing, the apparatus of the present invention is much simpler to operate. Moreover, the apparatus of the present invention is designed to get the attention of other divers, and accordingly is limited in its acoustic output.

SUMMARY OF THE INVENTION

The invention described and claimed herein comprises an underwater signaling unit adapted to be secured to the forearm of a diver. The apparatus includes a waterproof housing in which is located a transducer, and the transducer is in direct contact with the water and accordingly comprises one end wall of the housing. A circuit board is disposed within the housing adjacent to the transducer. Adjacent to the circuit board and transducer chamber within the housing, and separated from it, is a separate housing for receiving a battery. The circuit board and transducer portion of the housing comprises a sealed unit. Access to the battery chamber is provided for convenience in replacing the battery when needed. Attached to the housing adjacent to the transducer is a directional cone for directing the output of the transducer. The transducer is activated by a magnet movable on the exterior of the housing. A pair of magnetic switches on the circuit board within the housing control the transducer to provide either a solid tone output or a pulsed tone output.

Among the objects of the present invention are the following:

To provide new and useful underwater signaling apparatus;

To provide new and useful underwater signaling apparatus utilizing a transducer in direct contact with the water;

To provide new and useful apparatus for providing an audible tone underwater;

To provide new and useful underwater signaling apparatus including a housing having a magnet movable on the housing to actuate a switch within the housing;

To provide new and useful underwater signaling apparatus for providing different signals in response to the setting of switches; and To provide new and useful underwater signaling apparatus having a housing with a sealed chamber in which is disposed a transducer and associated electrical circuitry and a separate chamber in which is disposed a power supply for operating the circuitry and the transducer.

BRIEF DESCRIPTION OF THE DRAWING

FIG. 1 is a perspective view of the apparatus of the present invention.

FIG. 2 is a perspective view of the rear portion of the apparatus of the present invention.

FIG. 3 is a view in partial section taken generally along line 3—3 of FIG. 1.

FIG. 4 is a view in partial section taken generally along line 4—4 of FIG. 3.

FIG. 5 is a view in partial section taken generally along line 5—5 of FIG. 3.

DESCRIPTION OF THE PREFERRED EMBODIMENT

FIG. 1 is a front perspective view of underwater signaling apparatus 10 embodying the present invention. The underwater signaling apparatus 10 includes a generally cylindrical housing 12, a front horn 110, a rear cap 130, and a slide switch 150. FIG. 2 is a rear perspective view of a portion of the housing 12. FIG. 3 is a view in partial section, taken generally along line 3—3 of FIG. 1, showing the various elements within the housing 12. Within the housing 12 are the various electrical components mounted on two circuit boards 60 and 62, a battery 98 for providing electrical power for the apparatus, a transducer 100 for providing an audible output, and switches for activating the electrical circuitry. The front horn 110 is appropriately secured to the housing 12 and extends about a portion of the transducer 100 and is secured to the housing. At the rear end of the apparatus 10 is the rear cap 130. The rear cap 130 is removable to replace the battery 98.

Within the housing 12 are two separate compartments or chambers, separated by a bulkhead 30. The bulkhead 30 divides the interior of the housing 12 into a front chamber or bore 32 and a rear chamber or bore 80. Within the front chamber 32 are the two circuit boards, an upper circuit board 60 and a lower circuit board 62. On the circuit boards are circuit components and elements necessary for the generation of sound by the transducer 100, as will be discussed below.

The housing 12 includes a longitudinally extending exterior slot 14 in which is disposed a slide switch 150. The front portion of the housing 12 includes an enlarged front diameter portion 16, while the rear portion of the housing 12 includes a threaded, reduced diameter portion 18. The reduced diameter threaded portion 18 terminates in a rear end 20.

The housing 12 includes an inner shoulder 34 extending generally perpendicular to the longitudinal axis of the front chamber 32. The shoulder 34 extends generally radially outwardly from the chamber 32. Extending longitudinally or axially with respect to the housing 12 from the inner shoulder 34 is a middle bore 36. The middle bore 36 conforms generally to the front enlarged diameter portion 16. There is a second shoulder 38 extending radially outwardly from the bore 36 remote from the shoulder 34. The shoulder 38 comprises a middle shoulder which extends between an outer bore 40 and the middle bore 36. The outer bore 40 terminates in a front end 42.

The front horn 110 is appropriately secured to the front enlarged diameter portion 16 of the housing 12. The front horn 110 will be discussed in more detail below.

Within the front chamber 32 is a pair of slots 50 and a pair of slots 52. The slots 50 comprise a pair of generally aligned upper parallel slots which receive the upper circuit board 60. The pair of slots 52 comprise a pair of lower, aligned and generally parallel slots which receive the lower circuit board 62. The slots 50 are appropriately spaced apart from the slots 52, and they are generally parallel to them.

Both the upper circuit board 60 and the lower circuit board 62 include a plurality of electronic components which are appropriately connected to each other and to the sound transducer 100. The sound transducer 100 is disposed against the inner shoulder 34 of the housing 12. The transducer 100 has a maximum outer diameter portion 102 which is substantially the same diameter as the middle bore 36.

The front horn 110 includes an inner bore 112 which has substantially the same inner diameter as that of the bore 36, and when the front horn 110 is connected to the housing 12, the bores 36 and 112 are generally aligned with each other and both fit over the major diameter portion 102 of the sound transducer 100.

The transducer 100 also includes a reduced diameter portion 104. The portion 104 extends outwardly from the portion 102 and is disposed within the bore 112 of the horn 110. The horn 110 serves to protect the transducer 100 and to help direct the sound generated by the transducer.

The front horn 110, in addition to the bore 112, includes an end 114 which is disposed against the middle shoulder 38 of the housing 12. Extending forwardly from the end 114 is an exterior cylindrical surface 116, the outer diameter of which is substantially the same as the inner diameter of the outer bore 40. The surface 116 accordingly is disposed against the bore 40 in a generally close fit.

The front horn 110 also includes a generally radially outwardly extending shoulder 118 which is disposed against the front end 42 of the housing 12. The horn 110 is appropriately secured to the housing 12 after the transducer 100 is disposed within the housing 12 and is appropriately electrically connected to the various circuit elements on the circuit boards 60 and 62. It will be noted that the transducer 100 is in direct contact with the water in which the apparatus is adapted to be used. Thus, there is no wall or other artificial barrier between the transducer 100 and the water. Again, it will be noted that the horn 110 is disposed generally about the transducer 110. Essentially, the horn 110, as secured to the housing 12, comprises a protective covering extending circumferentially about the transducer 100, or about the cylindrical portions 102 and 104 of the transducer 100, to protect the transducer from harm. The horn 110 is open to the front, or away from the housing 12, to allow the transducer 100 to have direct access to the water medium in which it will produce a sound and which will carry the sound produced by the transducer 100.

The transducer 100 is appropriately sealed to the housing 12 to insure the water-tight integrity of the chamber 32. A seal 106 is shown disposed between the transducer 110 and the shoulder 34 of the housing 12.

Extending rearwardly from the upper circuit board 60 is a plug 64. The plug 64 extends through the bulkhead 30 and is appropriately sealed therein to insure the water-tight integrity of the two compartments 32 and 80. The plug 64 includes two separate conductors for connection between the battery 98 and the various circuit elements.

Extending upwardly from the upper circuit board 60 are three reed switches. There is a rear magnetic reed switch 66, a central or center magnetic reed switch 68, and a front magnetic reed switch 70. The magnetic reed switches 66, 68, and 70 are disposed adjacent to the housing 12 and specifically adjacent to the longitudinally extending exterior slot 14. The slide switch 150 is disposed in the slot 14 and moves adjacent to the switches 64, 66, and 68, as will be discussed below.

Within the rear chamber 70 is a battery bracket 82. The battery bracket 82 is generally an "L" shaped bracket, with a relatively long axially extending arm 84 and a relatively short transversely extending arm 86. A battery holder bracket 90 is appropriately secured to the relatively long arm 84 of the bracket 82. The battery holder bracket is preferably nonconductive. It includes a long arm 92 and a short arm 94. The long arm 92 is secured to the arm 84 of the battery bracket 82. The short arm 94 is spaced apart from the short arm 86 of the bracket 82. A battery clamp 96 is secured to the battery long arm 92. A battery 98 is in turn held to the arm 92 of the battery holder bracket 90 and the arm 84 of the bracket 82 by the clamp 96.

The short arm 94 of the bracket 90 includes appropriate terminals for the battery posts of the battery 98. The battery 98 is preferably a common 9 volt battery. The arm 86 of the bracket 82 includes a jack 88. The jack 88 is appropriately connected to the terminals on the arm 94. The jack 88 receives or mates with the plug 64 which extends into the chamber 80 to electrically connect the battery 98 to the electrical elements within the chamber 32.

As best shown in FIG. 4, the diameter of the bore 80 and the width of the arm 84 of the battery bracket 82 and the arm 92 of the battery holder bracket 90 are such that the elements within the chamber 80 are essentially fixed in place. They move only longitudinally to replace the battery 98 as required. Once inserted into the chamber 80, their movement is restrained by the dimensional limitations of the various affected elements.

The rear end cover 130 includes a flange 132 which extends axially forwardly from a rear end wall 134. The flange 132 is internally threaded to mate with the threads of the rear reduced diameter threaded portion 18.

A lanyard loop 136 extends outwardly from the rear end wall 134. A lanyard, shown in phantom in FIG. 2, is appropriately secured to the loop 136. The other end of the lanyard 138, not shown, may be appropriately secured to the arm of the swimmer (diver) using the apparatus 10.

An O-ring seal 140 is shown disposed between the housing 12 and the flange 132 of the end cap 130. The seal 140 insures the water-tight integrity of the end cap 130 and the chamber 80 of the housing 12.

The slide switch 150, as indicated previously, moves longitudinally with respect to the housing 12 in the exterior slot 14. The switch 150 includes three spaced apart magnets, a magnet 152, a magnet 154, and a magnet 156. The magnets 152, 154, and 156 are appropriately secured to the bottom of the slide switch and move with the switch on the bottom of the groove 14. The magnets 152, 154, and 156 are spaced apart a distance coinciding with the distance between the switches 66, 68, and 70.

Movement of the slide 150 sequentially turns on and off the three switches 66, 68, and 70, as desired.

In FIG. 3, the magnet 152 is shown disposed over the switch 66. When the magnet 152 is disposed over the switch 66, the switch 66 is actuated to cause the switch 66 to close. When the switch 66 closes, appropriate circuitry on the boards 60 and 62 is connected to the transducer 100 to provide a substantially constant output from the transducer 100.

When the switch 150 is moved rearwardly, or when the magnet 152 is removed from the proximity of the switch 66, the switch 66 opens to disconnect the circuitry and no sound is produced. On the other hand, when the switch 150 is moved to the position shown in FIG. 3, with the magnet 152 disposed over the switch 66, the switch 66 closes to provide the constant output, as discussed above.

When the switch 150 is moved forwardly so that the magnet 152 is over the switch 150, the magnet 154 is over the switch 66. In this position of the switch 150, the switch 66 is opened by the magnet 150 and the switch 68 is closed by the magnet 152. With the switch 68 in the closed, conducting position, appropriate circuitry is connected to the transducer 100 to provide an intermittent or pulsed output from the transducer 100. The duration of each sound output pulse, and the interval between the sound output pulses, is appropriately controlled by the various circuit elements involved.

When the slide switch 150 is moved forwardly again to its front position, the magnet 152 is disposed adjacent to the switch 70 to turn the switch 70 on. The magnet 154 is then disposed over the switch 68, and maintains the switch 68 in the open position. The magnet 156 is disposed over the switch 66 to maintain the switch 66 in its open position also.

With the switch 70 closed, appropriate circuitry is connected to the transducer 100 to provide a substantially continuous SOS signal. The SOS signal is, of course, an internationally recognized distress signal, comprising spaced intervals of three dots, three dashes, and three dots. Again, the duration of the dots and the dashes, and the interval between them, is determined by the circuitry involved.

Obviously, the electrical power for providing the output from the transducer 100 is provided by the battery 98. In order to change the battery 98, the end cap 130 is removed from the housing 12, the battery bracket 82 is removed from the chamber 80, and the battery 98 is removed from the clamp 96 and the longitudinal arm 92 of the battery board bracket 90 and a fresh battery 98 is reinstalled within the clamp 96 and appropriately connected to the battery board bracket 90. The battery bracket 82 is then reinserted into the chamber 80, with the jack 88 again receiving the portion of the plug 64 within the chamber 80. The cap 130 is then reinstalled on the rear portion 18 of the housing 12 and the apparatus 10 is then ready for use.

The frequency of the sound output from the transducer 100 is preferably of a frequency to maximize the travel of the sound waves in the water medium in which the apparatus 10 is used. While the frequency of the sound produced by the transducer 100 is generally fixed, the duration of the sound, or the sound pulses, is dependent upon the involved circuitry on the circuit boards 60 and 62.

The apparatus 10 is preferably buoyant in that it will float and accordingly will not be lost if it comes loose from a diver. The diver will, of course, be tethered to the apparatus 10, or vice versa, through the lanyard 138. If desired, rather than being connected through a lanyard, the apparatus 10 may be connected to the diver in any other appropriate manner. However, the lanyard connection helps to insure that the apparatus 10 will not drift away from the diver and will be handy and available if and when needed for signaling purposes by a diver.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Underwater signalling apparatus, comprising, in combination:
   housing means, including a first chamber and a second chamber;
   transducer means for providing an audible output at least partially disposed in the first chamber;

circuitry means disposed in the first chamber and connected to the transducer means for providing an output for the transducer means;

first switch means in the first chamber connected to the circuitry means for activating the circuitry means to provide the output for the transducer means;

second switch means on the housing means and movable to actuate the first switch means; and battery means in the second chamber for providing electrical power for the circuitry means and the transducer means.

2. The apparatus of claim 1 in which the housing means includes a generally cylindrical housing, a front horn extending outwardly from the housing, a bulkhead within the housing separating the first chamber from the second chamber, and an end cap removably securable to the housing for closing the second chamber.

3. The apparatus of claim 2 in which the transducer means is secured to the housing and it extends into the front horn.

4. The apparatus of claim 1 in which the second switch means includes magnetic means magnetically coupled to the first switch means and movable to a plurality of positions for actuating the first switch means.

5. The apparatus of claim 1 in which the circuitry means is coupled to the transducer means to provide a plurality of audible outputs.

6. The apparatus of claim 5 in which the first switch means includes a plurality of first switches, each of which is coupled to a separate portion of the circuitry means to provide a separate output from the transducer means when actuated by the second switch means.

7. The apparatus of claim 6 in which the second switch means includes a plurality of magnetic elements movable on the housing for sequentially actuating the plurality of first switches to provide the desired audible outputs.

8. The apparatus of claim 1 in which
the housing means includes a bulkhead disposed between the first and second chambers;
the circuitry means includes first electrical connector means extending through the bulkhead and into the second chamber for providing electrical connection with the battery means; and
the battery means includes a battery, bracket means adapted to receive the battery, second electrical connector means for providing electrical connections for the battery, and third electrical connector means connected to the first and second electrical connector means for providing electrical connection between the battery and the first electrical connector means.

9. The apparatus of claim 8 in which the bracket means includes a first arm for receiving the battery and a second arm to which the third electrical connector means is secured, and the bracket means is removably connected to the first electrical connector means by the third electrical connector means.

10. Signalling apparatus, comprising, in combination:
housing means for receiving electronic elements, including
a generally cylindrical housing,
a removable end cap, and
a horn extending outtwardly from the cylindrical housing remote from the end cap;
transducer means for providing an audible output at least partially disposed in the housing means;
circuitry means disposed in the housing means and connected to the transducer means for providing an output for the transducer means;
first switch means in the housing means connected to the circuitry means for activating the circuitry means to provide the output for the transducer means;
second switch means on the housing means and movable to actuate the first switch means; and
battery means in the housing means for providing electrical power for the circuitry means and the transducer means.

11. The apparatus of claim 10 in which the circuitry means is connected to the transducer means to provide a plurality of audible outputs from the transducer means.

12. The apparatus of claim 10 in which the first switch means includes a plurality of magnetic switches, each of which is coupled to the circuitry means to provide a separate output for the transducer means when actuated by the second switch means.

13. The apparatus of claim 12 in which the second switch means includes magnetic element means for actuating sequentially the plurality of magnetic switches of the first switch means to provide the desired audible outputs from the transducer means.

14. The apparatus of claim 10 in which
the circuitry means includes first electrical connector means for providing electrical connection to the battery means; and
the battery means includes a battery, bracket means adapted to receive the battery, second electrical connector means for providing electrical connections for the battery, and third electrical connector means connected to the first and the second electrical connector means for providing electrical connection between the battery and the first electrical connector means.

15. The apparatus of claim 14 in which the bracket means includes a first arm for receiving the battery and a second arm to which the third electrical connector means is secured, and the third electrical connector means is removably connected to the first electrical connector means for removing the battery means from the housing means.

* * * * *